United States Patent
Schütze

(10) Patent No.: US 10,105,666 B2
(45) Date of Patent: Oct. 23, 2018

(54) METHOD FOR DISPENSING A FLUID MEDIUM

(71) Applicant: PROMERA GmbH & Co. KG, Sennfeld (DE)

(72) Inventor: Thomas Schütze, Schonungen (DE)

(73) Assignee: PROMERA GmbH & Co. KG, Sennfeld (DE)

( * ) Notice: Subject to any disclaimer, the term of this patent is extended or adjusted under 35 U.S.C. 154(b) by 0 days.

(21) Appl. No.: 14/367,127

(22) PCT Filed: Nov. 8, 2012

(86) PCT No.: PCT/EP2012/072159
§ 371 (c)(1),
(2) Date: Jun. 19, 2014

(87) PCT Pub. No.: WO2013/091992
PCT Pub. Date: Jun. 27, 2013

(65) Prior Publication Data
US 2014/0326322 A1 Nov. 6, 2014

(30) Foreign Application Priority Data
Dec. 23, 2011 (DE) .................. 10 2011 122 268

(51) Int. Cl.
*B01F 15/02* (2006.01)
*B01F 15/04* (2006.01)
*G01F 11/02* (2006.01)

(52) U.S. Cl.
CPC ...... *B01F 15/0462* (2013.01); *B01F 15/0458* (2013.01); *G01F 11/024* (2013.01);
(Continued)

(58) Field of Classification Search
None
See application file for complete search history.

(56) References Cited

U.S. PATENT DOCUMENTS 3,802,805 A * 4/1974 Roeser ............... B01F 15/0237
417/398
4,081,111 A * 3/1978 Sandow ............. B05B 11/3001
222/309
(Continued)

FOREIGN PATENT DOCUMENTS

EP 0576762 A1 1/1994

OTHER PUBLICATIONS

International Search Report issued in PCT International Patent Application No. PCT/EP2012/072159, dated May 2, 2013, with English translation.
(Continued)

*Primary Examiner* — John Fox
(74) *Attorney, Agent, or Firm* — Panitch Schwarze Belisario & Nadel LLP

(57) ABSTRACT

The invention relates to a method for metering a fluid medium by means of a metering device in the form of a piston pump having a cylinder (Z) and a movable piston (3), wherein the cylinder (Z) and the piston (3) form a working space (A), characterized in that
in a first method step a given filling quantity of the fluid medium is conveyed into the working space (A), wherein the filling quantity is greater than the predefined quantity to be metered, and in that
in a further method step the piston (3) reduces the size of the working space (A) to such an extent that the quantity to be metered remains in the working space (A), wherein at the same time a valve (18, 18') is opened so that the gas volume separated in the working space (A) and/or the excess fluid medium can flow out of the working space (A) through the piston, wherein to this end the piston (3) has at least one axially running through-channel (17, 17') which is connected to a return line (19, 19'), and at least the controllable valve
(Continued)

(18, 18') and/or a non-return valve is arranged in the through-channel (17, 17') and/or the return line (19, 19').

21 Claims, 3 Drawing Sheets

(52) U.S. Cl.
CPC .......... *G01F 11/029* (2013.01); *G01F 11/023* (2013.01); *Y10T 137/0329* (2015.04); *Y10T 137/0352* (2015.04)

(56) References Cited

U.S. PATENT DOCUMENTS

| | | | |
|---|---|---|---|
| 4,611,982 A * | 9/1986 | Haeuser | B01F 15/0237 264/328.2 |
| 4,741,623 A * | 5/1988 | Haeuser | B01F 15/0237 222/318 |
| 4,878,601 A * | 11/1989 | Flemming | B01F 13/1058 222/137 |
| 5,831,151 A * | 11/1998 | Ondrus | G05D 11/139 73/61.41 |
| 6,860,137 B2 * | 3/2005 | Kitagawa | B01F 15/0022 137/3 |
| 8,191,733 B2 * | 6/2012 | Seppanen | B44D 3/08 222/1 |
| 2002/0107501 A1 | 8/2002 | Smith et al. | |
| 2003/0019885 A1 | 1/2003 | Luehrsen et al. | |
| 2011/0110179 A1 * | 5/2011 | Richards | A01J 7/04 366/142 |

OTHER PUBLICATIONS

Int'l Preliminary Report on Patentability dated Jul. 3, 2014 in Int'l Application No. PCT/EP2012/072159.

* cited by examiner

Fig. 2
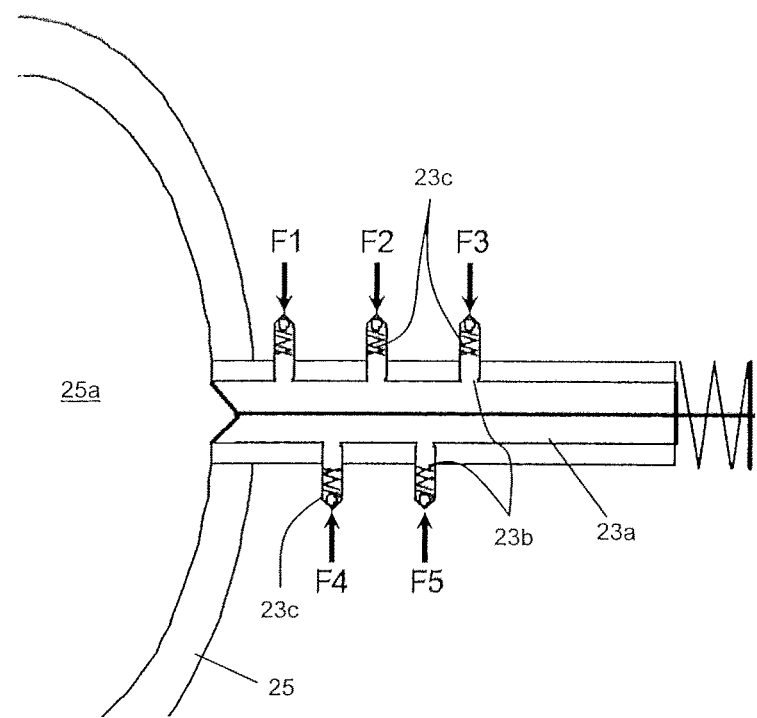
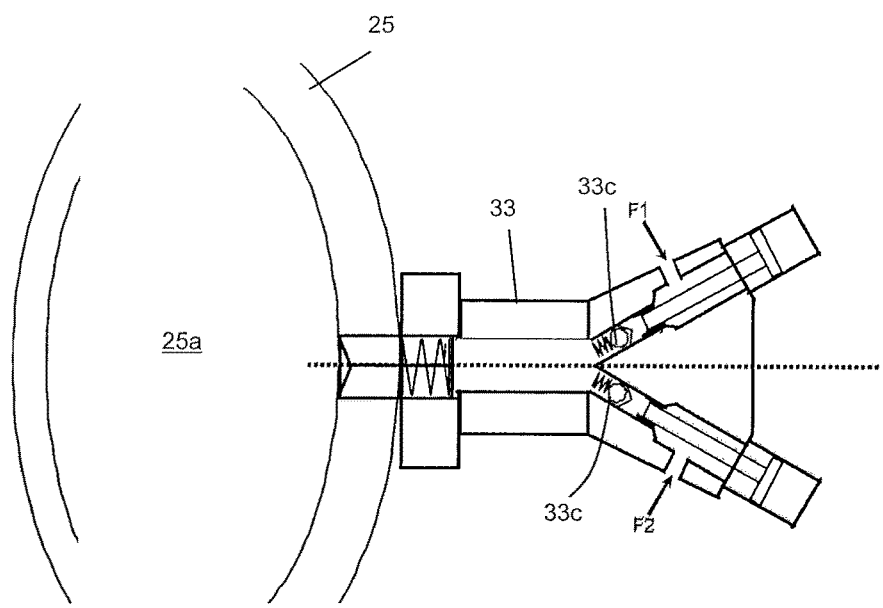
Fig. 3

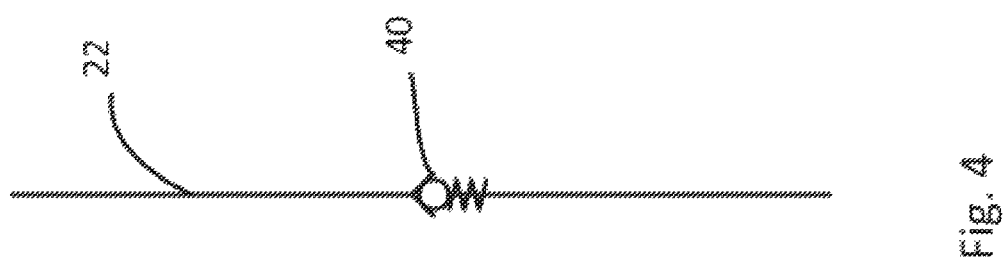

METHOD FOR DISPENSING A FLUID MEDIUM

CROSS-REFERENCE TO RELATED APPLICATIONS

This Application is a National Stage of PCT International Application No. PCT/EP2012/072159, filed on Nov. 8, 2012, and claims priority of German Patent Application No. 10 2011 122 268.9, filed on Dec. 23, 2011. The disclosures of the aforementioned applications are incorporated herein in their entirety by reference.

FIELD OF ENDEAVOR

The present invention relates to a method for metering a fluid medium by means of a metering device in the form of a piston pump having a cylinder and a movable piston, wherein the cylinder and the piston form a working space.

BACKGROUND

In a wide range of industry sectors, for example rubber manufacture, foodstuff production, etc., mixtures are produced in batch operation, for which various liquids are metered into a mixer. The mixer is intended to mix solids and liquids in a mixing process to form a homogeneous mass. In order to create reproducible masses, the manufacturer requires, besides the weighed solids, also an addition of one or more precisely metered liquids or fluids in order to impart specific properties to the end product that is then to be manufactured in a subsequent process.

Inter alia, weighing systems are known for the liquids to be metered. In said weighing systems, different fluids, in particular liquids, are metered and weighed one after the other into an intermediate container via separate feed lines, in order then to supply them as a whole to the mixer via a suitable conveying pump. At the time of a batch change, that is to say when another mixture is to be produced, the feed line is still filled with the old recipe. This means that a so-called intermediate mixture is obtained, which does not correspond to the previous mixture or to the new mixture.

Combined weighing and piston systems are also known on the market, in which firstly a container on a set of scales is filled with the appropriate quantity of a liquid for a specific mixture, then this liquid from the weighing container is buffer-stored in a so-called metering cylinder by means of a conveying pump and is checked once again with regard to the desired quantity in order then to be fed to the mixer after the shot has been approved. This method is therefore a combined metering system which operates gravimetrically and volumetrically.

Also known are piston metering systems which are controlled by means of a mass through-flow measuring system. However, these measuring systems, which operate according to the Coriolis principle, are often not accurate enough in challenging industrial operations, in particular due to shaking or vibrations, or falsify the result during shot operation since the systems often have to be smoothed or filtered electronically or by means of software.

The systems described above are based predominantly on gravimetric metering or measurement, with the advantages and disadvantages known in industry.

SUMMARY OF ASPECTS OF THE DISCLOSURE

The object of the new method is to enable a highly accurate volumetric metering.

This object may be achieved, e.g., using features found in one or more of the accompanying claims.

The mixing recipes usually do not give volume details but rather weight details for the individual components of the mixture. When using a piston pump as the metering device, however, this is able to meter only a given volume. However, the density of the fluid medium to be metered changes with the temperature and the pressure to which it is exposed in the working space of the piston pump. Nevertheless, the method according to the invention determines the temperature of the fluid medium flowing into the working space during the metering process. The gas volume contained in the working space may also optionally be determined. Since the volume of the medium changes with the temperature, if the temperature is known then it is possible to calculate the necessary conveying volume, corresponding to the weight prescribed for the medium, and thus a metering start position to be set for the piston.

In the method according to the invention, therefore, firstly the working space of the metering device is filled with a filling quantity, the volume of which is greater than the conveying volume to be metered. Once the temperature of the filling quantity has been determined, the conveying volume to be metered can be determined. By moving the piston into the metering start position, the excess fluid is let out of the working space via an open valve and can be conveyed back into the reservoir. If the valve is arranged at the topmost position of the working space, then when the piston is moved into the metering start position any gas or air contained in the working space is at the same time pushed out of the working space provided that the gas has gathered in the upper region of the working space.

The method according to the invention moreover provides that the gas loading of the filling medium is determined, as a result of which an even more accurate metering can be achieved. The determination or estimation of the gas contained in the filling quantity can advantageously be determined via an additional method step in which the filling quantity conveyed into the working space is placed under a given pressure by means of the piston while the valves are closed. Based on the displacement travel of the piston, it is possible to determine the gas loading, which is then taken into account when calculating the metering start position.

Advantageously, the piston pump of the metering device is arranged such that the piston is moved up and down in the vertical direction. This arrangement makes it possible to arrange at the highest point the valve for removing the excess filling quantity or the undesired gases enclosed within the working space. If the working space is reduced in size when the piston is moved upwards, the valve must thus be arranged in the lower base wall of the cylinder. If the working space is reduced in size when the piston is moved downwards, the valve must be arranged in the piston itself.

Of course, it is possible that more than one fluid medium is metered by one metering device. To this end, it is necessary to provide a number of feed lines and check valves corresponding to the number of media to be metered. Corresponding numbers of outlet lines and valves must also be provided if the excess media are to be conveyed back into the corresponding reservoir as the piston is moved into the metering start position.

The method according to the invention thus has the advantages of gravimetric metering and is superior to the latter in terms of accuracy since temperature fluctuations and gas inclusions in the medium to be metered are taken into account. By providing dedicated connecting lines between the downstream mixer and the working space for each individual component, undefined intermediate mixtures of various fluids are advantageously avoided.

The piston pump as the metering cylinder can advantageously be driven via a hydraulic cylinder, which in turn can be precisely positioned in terms of its longitudinal or up/down movement via a suitable measuring system and a hydraulic positioning valve.

BRIEF DESCRIPTION OF THE DRAWINGS

The method according to the invention will be explained in more detail below with reference to drawings.

In the drawings:

FIG. 2 shows the injection opening of a mixer according to the prior art;

FIG. 3 shows the inventive feed line to the mixer; and

FIG. 4 shows an example portion of a feed line, e.g., as in FIG. 1.

DETAILED DESCRIPTION OF ASPECTS OF THE DISCLOSURE

Figure 1:
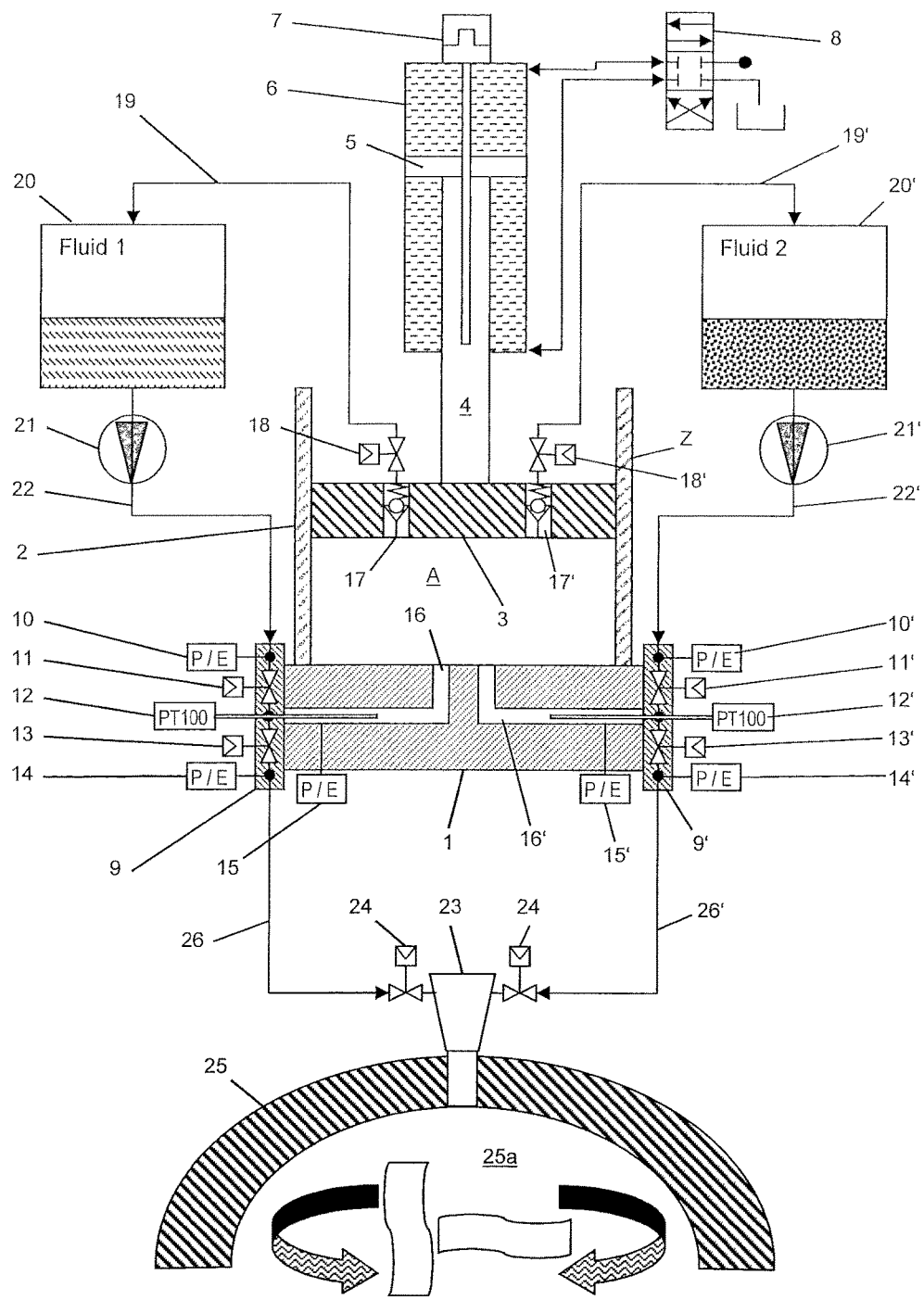
FIG. 1 shows a metering device with a downstream mixer.

FIG. 1 shows a metering device with a downstream mixer 25 for the method according to the invention. A metering process begins with the filling of the metering cylinder 2 with a given filling quantity, which is greater than the quantity to be metered. For this, the fluid to be metered is conveyed via an external pressure source, e.g. in the form of a pump 21, or by means of the metering device 2 itself, via a filling valve 11 into the working space A. The metering device 2 has a cylinder Z which is connected to a cylinder base 1. Arranged in the cylinder Z is the piston 3, which is driven by a piston/cylinder system 5, 6 via a piston rod 4. The position of the piston 5 of the piston/cylinder system 5, 6 is determined by means of the travel sensor 7. Thus, by means of the control valve 8, it is possible to predefine the precise position of the piston 5, as a result of which the piston 3 of the metering device, which is rigidly coupled thereto, can also be precisely positioned.

The metering device shown in FIG. 1 is able to convey the two fluids 1 and 2, which are stored in the reservoirs 20, 20', into the mixer chamber 25*a* of the downstream mixer 25 in a precisely metered manner. The fluids 1 and 2 are conveyed into the working space A of the metering device 2 from below by means of the conveying pumps 21, 21' via the feed lines 22, 22' and the inlet valves 11, 11' in the feed channels 16, 16' located in the cylinder base 1. Pressure sensors 10, 10' monitor whether a sufficiently high pressure can be built up in the feed lines 22, 22', by which the leaktightness of the feed lines 22, 22' can be checked. The temperature sensors 12, 12' continuously measure the temperature of the filling quantity during the filling process, as a result of which the average temperature thereof can be determined. When filling the working space A, the piston 3 is actively moved upwards. In doing so, care is taken to ensure that the piston 3 is not moved upwards too quickly, so that no vacuum is created. If a vacuum were to be created, volatile components in the fluid to be metered could evaporate. The subsequent measurement process would detect these filling defects and would cancel the upcoming metering process.

Arranged in the piston 3 are through-channels 17, 17', in which a non-return valve may optionally be arranged. Each through-channel 17, 17' is connected to a return line 19, 19', in which a controlled valve 18, 18' is respectively arranged. Via the return lines 19, 19', the excess fluid is conveyed back into its associated reservoir 20, 20'.

The metering device furthermore has for each fluid 1 and 2 a connecting line which in each case connects an inlet channel 16, 16' to the feed line 23 of the mixer 25, wherein a controlled valve 13, 24 or 13', 24' is respectively arranged at the start and at the end of the feed line 26, 26'. The valves 13, 13' prevent fluid from passing from the feed line 22, 22' into the connecting line 26, 26' during the filling of the working space A. A respective feed line 22, 22' may have a respective non-return valve 40 incorporated therein, e.g., as shown in FIG. 4, either instead of or along with respective valve 13, 13'. The valves 24, 24' serve to prevent the conveyed fluid from entering the other connecting line during the conveying of a metered fluid into the mixer chamber 25*a*. The described metering device has a control system (not shown), in which the recipe for the upcoming batch is stored. The quantity to be metered of a given fluid is generally stored and thus known in the weight unit g or kg.

In the method according to the invention, it is not the weight of the fluid but rather the density thereof that is determined via the temperature and optionally also via the gas volume contained in the fluid.

The method according to the invention provides that an additional quantity of approximately 2 to 10% more than what is actually required is always conveyed into the working space A. This additional quantity ensures that, when determining the density of the filling quantity in the working space A, it is not found that the current filling quantity is actually less than the quantity to be metered. The size of the additional quantity can be fixedly predefined. However, it is also possible for it to be adjusted in an adaptive manner. That is to say that the system is able to learn on the basis of the preceding density determinations and thus can adjust the additional quantity for the fluid in question so that it is not selected to be too large.

Once the metering cylinder Z has been filled, the filling valve 11, 11' on the cylinder base 1 closes. By moving the material piston 3 downwards, the compressibility of the fluid located in the working space A is then checked and measured via the travel of the piston 3, 5 and by detecting the pressure by means of the pressure sensor 15, 15' in the fluid. In so doing, it is possible to ascertain whether any air or gas inclusions are present in the fluid to be measured. All this information, such as temperature and gas loading and compressibility of the fluid, density values via the temperature, which are stored in the control system, are then correlated in such a way that the precise position of the piston 3, 5 for the desired metering quantity provided in the recipe is calculated. Once this metering start position is then calculated, a material valve 18, 18' in the material piston 3 opens and the hydraulic cylinder 5, 6 moves into the calculated position. In the process, the material piston 3, via the open valve, pushes the excess quantity back in a largely pressureless manner via the return line 19, 19' into the material reservoir 20, 20'. Once the calculated metering start position is reached, the valve 18, 18' in the material piston 3 closes. The metering quantity provided in the recipe is then set and prepared for the next shot into the mixer 25.

In order that the excess fluid and any air/gas inclusions can be conveyed out of the metering cylinder, the outlet must be arranged at the highest point in the working space A since air/gases rise upwards. If the working space A is reduced in size when the piston 3 is moved downwards, the outlet in the form of the through-channel 17 must thus be arranged in the piston 3. If the working space A is reduced in size when the piston 3 is moved upwards, the outlet in the form of the through-channel 17 must be arranged in the cylinder base 1.

Once the signal for metering has been given by the mixing control system, the outlet valve 13, 13' in the cylinder base 1 opens and the piston 3 moves downwards at a desired speed and thus pushes the fluid into the mixer 25. Once the lowermost position of the piston 3 is reached, the desired quantity of fluid is located in the mixer chamber 25a of the mixer 25.

In the lowermost position, the piston 3 bears as fully as possible against the cylinder base 1, so that the working space is emptied as fully as possible. As a result, the metering cylinder in principle no longer contains any fluid residue. This circumstance then makes it possible to meter several, that is to say also more than two, different liquids/fluids by means of the metering cylinder, as a result of which acquisition costs are lowered. However, each fluid is equipped with its own inlet valve 11, outlet valve 13, which are advantageously arranged in the cylinder base 1, as well as a material valve 18 in the material piston 3 and their own pressure sensors 10, 14, 15 and temperature sensors 12, so that all the feed lines 22, metering lines 26 and return lines 19 are always contaminated with the same fluid.

On the presently known mixers, usually 4 or 6 injection openings are provided. If, depending on the recipe, more than 4 or 6 liquids are to be fed to the mixer 25 simultaneously or one after the other, that is to say with a time offset, it must also be possible for a plurality of fluids to be connected to one injection opening 23. An injection tube 23 known from the prior art is shown in FIG. 2. The injection opening 23 has a connection tube 23a, on which five fluid connections 23b are provided in an axially offset manner. Each fluid connection 23b has a non-return valve 23c which is arranged such that the fluid to be metered can flow to the mixer but cannot pass into another fluid feed line 26. This functions only as long as all the non-return valves 23c function in a trouble-free manner. However, should the non-return valves 23c not be leaktight, the fluid to be metered can be pushed by the prevailing metering pressure into another pressureless feed line 26. This gives rise to undesired and unknown "blends" within the feed lines 26 connected to an injection tube 23a. The recipe instructions are then no longer adhered to with the desired accuracy. Furthermore, due to the axial offset of the fluid connections 23b, different remaining quantities of residue are in the injection tube 23a at the time of a recipe change. This circumstance, too, leads to undefined recipe shifts at least for the first shot of a new recipe.

To this end, the invention proposes a newly developed injection opening 33 which can have a plurality of connections for different fluids. For instance, six or more fluids can be metered to the mixer via one metering device. The injection opening 33 is characterised in that the channel length for each fluid from the connection point into the mixer chamber 25a is as short as possible and of equal length. All the fluid connections 33b are arranged radially so that, for each fluid, the same changeover volume exists in the injection opening 33. Furthermore, a non-return valve 33c is arranged in each fluid channel 33b. In addition, a controlled fluid valve 24 may be fitted above each non-return valve in order actively to open and also close precisely one fluid channel. By virtue of the pressure sensor 14 at the outlet of the metering device, the state of the connecting line 26 and of the corresponding fluid valve 24 is checked at all times for leaktightness and correct functioning. By evaluating the pressures in the control system, therefore, an information item to perform appropriate maintenance is generated in good time. Moreover, incorrect meterings or undesired blends between the fluids can be prevented.

After a metering process, a residual pressure in the connecting line 26 can also be maintained by the actively controlled valves 14, 24. If this enclosed pressure then falls or rises as time goes on, corresponding conclusions can be drawn about the fluid strand.

By virtue of the overall system of metering device and injection opening or injection valve 33, in particular due to the additional use of an actively controlled fluid valve 24, process stability and reproducibility of recipes can be increased and maintenance instructions can be generated in good time.

The course of one possible cycle with venting of the gas volume will be described in detail below:

1. The piston 3 rests at the bottom on the cylinder base 1. The fluid filling valve 11 is opened. The conveying pressure of the conveying pump 21 is measured via the pressure sensor 10. If the fluid pressure is sufficient, the fluid piston 3 moves upwards so quickly that no vacuum is detected by the pressure sensor 15, so that there is no risk of evaporation of the fluid;

2. During the filling process, the fluid temperature of the filling quantity is constantly measured via the temperature sensor 12 and thus the average temperature of the fluid located in the cylinder 2 is calculated;

3. By virtue of the calculated temperature of the filling quantity, the corrected metering volume and thus the necessary start position of the piston 3 is calculated via the change in density of the fluid;

4. The filling position to which the piston must move is obtained from the start position plus a defined overfill quantity or additional quantity;

5. Once the filling position to which the piston must move is reached, the fluid filling valve 11 closes. The position of the piston 5 and thus the position of the piston 3 is constantly determined via the travel measurement 7;

6. The cylinder system (1, 2 and 3), which is now completely closed, that is to say the completely closed working space A, is then placed under a given pressure by moving the fluid piston 3 downwards. During this, the pressure is continuously measured by means of the pressure sensor 15;

7. Once the test pressure or measurement pressure in the working space A is reached, the compression travel is also known by the travel sensor 7. Using this value, it is possible to calculate the gas loading and thus the ultimately correct metering start position;

8. The pressure in the space in then released by moving the fluid piston 3 upwards;

9. With the overfill valve 18 open, the piston 3 is then moved into the calculated and corrected metering start position;

10. Once the metering start position is reached, the overfill valve 18 closes;

11. The fluid piston 3 then moves downwards to the desired metering start pressure and waits on the signal from the mixer 25 to shoot the fluid via the connecting line 26 into the mixer chamber 25a of the mixer 25;

12. In this "pressure position", all the valves 11, 13 and 17 and seals are checked for leaktightness;

13. When the signal arrives from the mixing control system to inject the fluid, the valves 13 and 24 open and the fluid piston 3 moves downwards at a predefined speed, which is calculated via the injection time provided for this fluid in the recipe;

14. Once the lower "empty position" is reached, the valves 13 and 24 continue to remain open for a predefined holding time;

15. After this time has elapsed, the valves 13 and 24 are closed and the next filling process can begin.

What is claimed is:

1. A method for metering a fluid medium by means of a metering device in the form of a piston pump having a cylinder and a movable piston, wherein the cylinder and the piston form a working space, the method including:
conveying a given filling quantity of the fluid medium into the working space, wherein the filling quantity is greater than a predefined quantity to be metered, and
using the piston to reduce the size of the working space to such an extent that the quantity to be metered remains in the working space, and at the same time opening at least one valve to allow a gas volume separated in the working space, excess fluid medium, or both, to flow out of the working space through the piston, wherein the piston has at least one axially running through-channel which is connected to a respective at least one return line coupled to the at least one through-channel, and wherein the at least one valve is arranged in a location selected from the group consisting of the at least one through-channel or the at least one return line.

2. The method according to claim 1, further including determining a temperature of the fluid medium located in the working space during said conveying.

3. The method according to claim 1, further comprising determining a density of the fluid medium located in the working space and wherein said using the piston comprises reducing the size of the working space by moving the piston to such an extent that a volume of the working space corresponds to the quantity to be metered.

4. The method according to claim 1, further comprising:
prior to said using the piston, either estimating or calculating a gas volume contained in the filling quantity by either:
increasing a pressure in the working space by using the piston and at the same time determining a distance traveled by the piston, wherein the estimating or calculating the gas volume takes place based on the basis of the distance traveled by the piston and the change in pressure;
or, alternatively, moving the piston by a given distance in order to increase the pressure in the working space and determining a pressure increase achieved thereby, wherein the estimating or calculating the gas volume takes place based on the distance by which the piston is moved and the change in pressure.

5. The method according to claim 4, wherein a change in temperature during a preceding increase in pressure is determined and is taken into account when estimating or calculating the gas volume contained in the fluid medium.

6. The method according to claim 1, the method further including adjusting a volume of the working space or a position of the piston with the at least one valve open; and
wherein the quantity of fluid medium to be metered is predefined for a given temperature and in a weight unit, and
wherein at least one quantity selected from the group consisting of a volume corresponding to the quantity to be metered and a piston position corresponding to the quantity to be metered is calculated on the basis of temperature and pressure in the working space determined during said using the piston.

7. The method according to claim 1, wherein the piston pump is arranged such that the at least one valve is arranged at a highest point in the working space, and wherein the piston is moved in a vertical direction.

8. The method according to claim 1, wherein at least one fluid medium is enabled to be conveyed into the working space of the piston pump via at least one feed line, and wherein the fluid medium is conveyed out of a reservoir by means of a further pump or is sucked into the working space by the piston pump itself.

9. The method according to claim 8, wherein at least one further valve selected from the group consisting of a controlled valve and a non-return valve is arranged in each feed line.

10. The method according to claim 1, further comprising conveying, by the metering device, and subsequent to said using the piston, the quantity of the fluid medium to be metered via at least one connecting line into a downstream mixer, wherein the piston reduces the size of the working space to its minimum.

11. The method according to claim 10, wherein at least one additional valve selected from the group consisting of a controlled valve and a non-return valve arranged in each connecting line to the mixer.

12. The method according to claim 10, wherein a pressure sensor measures pressure in the connecting line to the downstream mixer.

13. The method according to claim 1, further including:
using at least one pressure sensor to determine a pressure selected from the group consisting of a pressure in the working space and a pressure in a feed line to the working space; and
using the determined pressure to perform one or more operations selected from the group consisting of: determining a density, determining a gas volume in the fluid medium, and estimating a gas volume in the fluid medium.

14. The method according to claim 13, wherein at least one of the fluid medium or the gas passes from the working space into the return line and into a reservoir by virtue of the piston movement in said using the piston.

15. The method according to claim 1, wherein the at least one valve comprises at least one non-return valve.

16. The method according to claim 15, wherein the at least one non-return valve is disposed in the at least one through-channel.

17. The method according to claim 1, further comprising either estimating or determining a gas volume contained in the filling quantity, and wherein said using the piston comprises reducing the size of the working space by moving the piston to such an extent that a volume of the working space corresponds to the quantity to be metered.

18. The method according to claim 1, the method further including adjusting a volume of the working space or a position of the piston with the at least one valve open; and
wherein the quantity of fluid medium to be metered is predefined for a given temperature and in a weight unit, and
wherein at least one quantity selected from the group consisting of a volume corresponding to the quantity to be metered and a piston position corresponding to the quantity to be metered is calculated on the basis of a determined gas volume of the fluid medium located in the working space.

19. The method according to claim 1, wherein the at least one valve comprises at least one controllable valve.

20. The method according to claim 19, wherein the at least one controllable valve is disposed in the at least one return line.

21. The method according to claim 20, further comprising at least one non-return valve disposed in the at least one through-channel.

\* \* \* \* \*